Jan. 25, 1927.

W. PAGE 1,615,720

MAIL CATCHING AND DELIVERING DEVICE

Filed Jan. 27, 1926

Welton Page
INVENTOR

BY Victor J. Evans
ATTORNEY

Jan. 25, 1927.
W. PAGE
1,615,720
MAIL CATCHING AND DELIVERING DEVICE
Filed Jan. 27, 1926   2 Sheets-Sheet 2
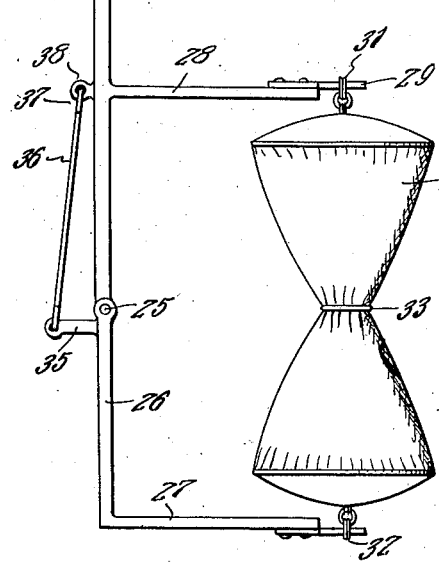
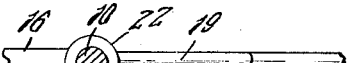
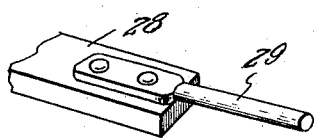

Patented Jan. 25, 1927.

1,615,720

UNITED STATES PATENT OFFICE.

WELTON PAGE, OF SWITCHBACK, WEST VIRGINIA.

MAIL CATCHING AND DELIVERING DEVICE.

Application filed January 27, 1926. Serial No. 84,217.

The object of this invention is to provide special means to be mounted in front of a car door and adapted to detachably support a mail sack, and means formed with or carried by the elements referred to for picking up a sack supported by suitable devices at the side of the track.

A further object is to provide a bar to be mounted in a horizontal position on a car door frame, the bar carrying a lever and bag pick-up means, and further carrying an outwardly extending arm for detachably supporting the top of a sack, and a pivoted angle arm for supporting the bottom of the sack in a similar manner.

With the foregoing and other objects in view, the invention consists in the construction and arrangement of elements described, illustrated and claimed, it being understood that modifications may be made within the scope of the claim, without departing from the spirit of the invention.

In the drawings forming part of this application,

Figure 3 is an elevation of the bag supporting means, from another angle.

Figure 4 shows the structure of Figure 3 with the lower bag support in released position.

Figure 5 is a detail view of one of the arms or pins for engaging a ring carried by the end of the sack.

Figure 6 is a detail view of the rod at the left of Figure 3, designed to maintain the lower bag support in operative position, as long as the bag engages the upper and lower horizontal arms or pins.

Figure 1:
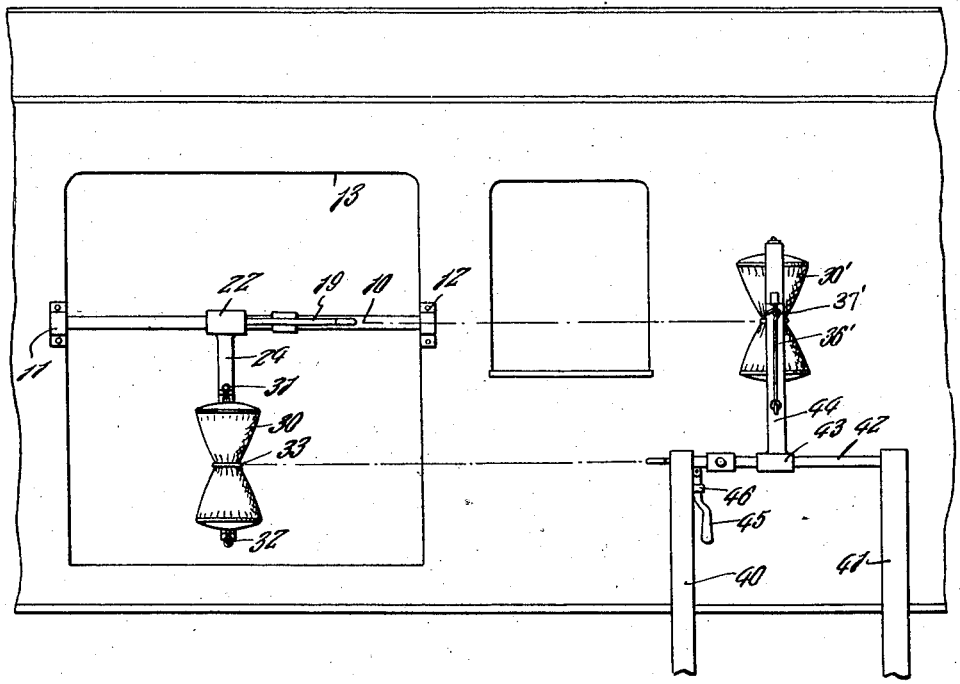
Figure 1 shows in elevation a portion of a car body with the device or devices to be mounted on the door frame, and the apparatus mounted at the side of the track for supporting the bag to be picked up.

In Figure 1, I have shown a horizontal shaft or bar 10 mounted at 11 and 12 in bearing brackets on opposite sides of the doorway of a car, a portion of the body of which is shown conventionally.

On bar 10, I mount a sleeve or the like 15, having an arm 16 extending inwardly therefrom, this sleeve also carrying a bracket 17 with an extension arm and U portion. The portion last named is designated 18, and is adapted to receive the tied portion of a sack, and the extension arm 19 is outwardly deflected and is provided with a rolled or turned over end portion 20.

Also connected with bar 10 is a sleeve 22 which has rigid connection with a downwardly extending bar 24, the latter having pivoted thereto, at 25, an angle arm 26 having a portion 27 designed to extend outwardly from the car body, when the device is in bag supporting position.

An upper arm 28 extends outwardly from bar 24 and is rigid therewith, and said bars or arms 27 and 28 have each connected therewith a pin or the like, such as that shown in Figure 5 and designated 29. These pins 29 support the upper and lower ends of the mail sack, 30, being connected therewith by means of rings or loop members 31 and 32, which loosely engage the said pins 29. The mail sack is tied at its central portion by means of a cord or strap extending therearound, the element last named being shown at 33.

Angle arm 26 has formed thereon, or connected therewith, a short arm 35, and a hook or connecting member 36, is loosely connected with arm 35, the bill 37 of the hook being adapted for engagement with eye member 38 on bar 24. The connecting device thus provided serves to maintain the proper position of the angle arm 26 including the laterally extending portion 27 thereof.

Another bag supporting device is mounted alongside of the track, and for this purpose I provide uprights or standards 40 and 41, adapted to mount a horizontal bar 42, the latter mounting a sleeve 43 supporting a bar 44, shown in Figure 1 as extending vertically. The position of bar 42, and therefore of bar 44, is determined by the controlling lever 45 adapted to engage a suitable retaining device 46.

Bar 44 includes a plurality of pivotally connected sections, maintained in the position of elements 24 and 26 of Figure 3, or in the same relative position, by means of the connecting rod 36′ terminating in an end portion 37′ forming the bill of the hook adapted to engage the eye member 38′.

This bag supporting device also includes outwardly extending arms such as 28′, adapted for detachable connection with the bag 30′, in the manner shown in Figure 3 in connection with the car carried device.

The track apparatus further includes the arm or bracket 17', the U member 18' and the outwardly deflected arm 19'.

Figure 2:
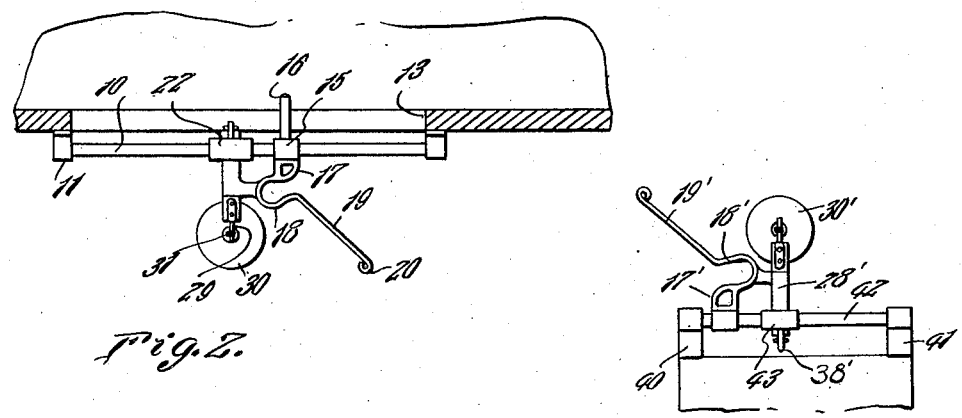
Figure 2 is a top plan view of the car carried means of Figure 1 and of the apparatus to be mounted at the side of the track.

In Figure 1, it will be observed that the arm 18 is in horizontal alinement with the middle portion of sack 30' supported at the side of the track. It will also be understood from Figure 1, that the sack 30, and especially the middle portion thereof, is in horizontal alinement with the outwardly deflected arm 19', shown at the right of Figure 2, so that as bag or sack 30' is picked up by the car carried device, 19, sack 30 will be delivered to the apparatus mounted alongside of the track and represented by the structure at the right of Figure 2 and especially by the sack receiving devices 17', 18' and 19'.

Having thus described the invention, what is claimed as new, is:—

In a device of the class described, a bar to be mounted in front of a door frame, a second bar extending downwardly from the bar first named, an arm extending laterally from the second arm, means for detachably connecting this bar with a mail sack, an angle arm pivoted to the lower end of the second bar and including an outwardly extending portion adapted to detachably mount the lower end of the sack, and a connecting device for maintaining the angle arm in position for engagement with the lower end of the sack, the connecting device engaging the second bar.

In testimony whereof I affix my signature.

WELTON PAGE.